(12) United States Patent
Hail et al.

(10) Patent No.: US 8,775,217 B1
(45) Date of Patent: *Jul. 8, 2014

(54) SYSTEM AND METHOD FOR MANAGING ACCOUNT PROCESSING

(75) Inventors: Mitzi R. Hail, Louisville, KY (US); Berry Hayes, Sr., Louisville, KY (US); Tom Taylor, Prospect, KY (US); Nickolas V. Altieri, Louisville, KY (US); Bobby T. Tokuuke, Mathews, KY (US); Mark Bates, Louisville, KY (US)

(73) Assignee: Trover Solutions, Inc., Louisville, KY (US)

( * ) Notice: Subject to any disclaimer, the term of this patent is extended or adjusted under 35 U.S.C. 154(b) by 147 days.

This patent is subject to a terminal disclaimer.

(21) Appl. No.: 13/154,202

(22) Filed: Jun. 6, 2011

Related U.S. Application Data

(63) Continuation of application No. 10/118,060, filed on Apr. 9, 2002, now Pat. No. 7,957,986.

(60) Provisional application No. 60/282,149, filed on Apr. 9, 2001.

(51) Int. Cl.
*G06Q 40/00* (2012.01)
*G06Q 50/00* (2012.01)

(52) U.S. Cl.
USPC .................................... 705/4; 705/3

(58) Field of Classification Search
USPC ........................................ 705/2–4
See application file for complete search history.

(56) References Cited

U.S. PATENT DOCUMENTS

| | | | |
|---|---|---|---|
| 4,773,009 A | 9/1988 | Kucera et al. | |
| 4,868,750 A | 9/1989 | Kucera et al. | |
| 5,182,705 A | 1/1993 | Barr et al. | |
| 5,442,780 A | 8/1995 | Takanashi et al. | |
| 5,504,674 A | 4/1996 | Chen et al. | |
| 5,550,734 A | 8/1996 | Tarter et al. | |
| 5,583,758 A | 12/1996 | McIlroy et al. | |
| 5,594,638 A | 1/1997 | Iliff | |
| 5,594,639 A | 1/1997 | Atsumi | |
| 5,666,492 A | 9/1997 | Rhodes et al. | |
| 5,832,488 A * | 11/1998 | Eberhardt | 1/1 |

(Continued)

FOREIGN PATENT DOCUMENTS

| | | |
|---|---|---|
| AU | 2001-89346 B2 | 5/2002 |
| AU | 2002-500982 | 5/2002 |

OTHER PUBLICATIONS

B. Bowers, "Bridging the great divide," *Best Review*, vol. 100, No. 7, p. 39-49, Nov. 1999, ISSN: 0161-7745. Dialog ID No. 01957225 46498745. (From Dialog File 15: ABI/Inform®).

(Continued)

*Primary Examiner* — Elaine Gort
*Assistant Examiner* — Jonathan Durant
(74) *Attorney, Agent, or Firm* — Finnegan, Henderson, Farabow, Garrett & Dunner, LLP

(57) ABSTRACT

Systems and methods for managing subrogation and recovery of insurance claims with a computer including receiving data for a first insurance claim; determining from the data whether the first insurance claim has recovery potential; thereafter when it is determined that the first insurance claim has recovery potential, collecting information about the event from which the first insurance claim was derived; repeatedly seeking data, as necessary, for additional insurance claims associated with the event such that all insurance claims arising from the event are processed together.

12 Claims, 18 Drawing Sheets

(56) References Cited

U.S. PATENT DOCUMENTS

| | | | |
|---|---|---|---|
| 5,835,897 A * | 11/1998 | Dang | 705/2 |
| 5,855,005 A | 12/1998 | Schuler et al. | |
| 5,918,217 A | 6/1999 | Maggioncalda et al. | |
| 5,950,169 A | 9/1999 | Borghesi et al. | |
| 5,991,733 A | 11/1999 | Aleia et al. | |
| 6,049,773 A | 4/2000 | McCormack et al. | |
| 6,336,096 B1 | 1/2002 | Jernberg | |
| 6,810,382 B1 | 10/2004 | Wamsley et al. | |
| 6,950,805 B2 | 9/2005 | Kavanaugh | |
| 7,343,308 B1 | 3/2008 | Rojewski et al. | |
| 7,571,107 B1 | 8/2009 | Jones et al. | |
| 2002/0035488 A1 | 3/2002 | Aquila et al. | |
| 2002/0035528 A1 | 3/2002 | Simpson et al. | |
| 2002/0087364 A1 | 7/2002 | Lerner et al. | |
| 2002/0177991 A1 | 11/2002 | Ejerhed | |

OTHER PUBLICATIONS

Office Action in co-pending U.S. Appl. No. 10/634,893 dated May 18, 2009, 15 pp.
Final Office Action in co-pending U.S. Appl. No. 10/634,893 dated Oct. 19, 2009, 16 pp.
Notice of Allowance in co-pending U.S. Appl. No. 10/634,893 dated Apr. 7, 2010, 13 pp.
Notice of Allowance in co-pending U.S. Appl. No. 10/634,893 dated Jul. 12, 2010, 14 pp.
IRT Business This Week 2 (Fraud): Some insurance firms have paid bounties to beat fraud—Insurers say fraudulent claims cost them (pounds) 30 million last year.

* cited by examiner

SYSTEM AND METHOD FOR MANAGING ACCOUNT PROCESSING

CROSS REFERENCE TO RELATED APPLICATION

This is a continuation of application Ser. No. 10/118,060, filed Apr. 9, 2002, issuing as U.S. Pat. No. 7,957,986. Application Ser. No. 10/118,060 claims the benefit under 35 U.S.C. §119(e) of U.S. Provisional Patent Application No. 60/282,149, filed Apr. 9, 2001. All of these applications are incorporated herein by reference in their entirety.

DESCRIPTION OF THE INVENTION

1. Field of the Invention

This invention relates to systems and methods for managing account processing, and more particularly, to systems and methods for managing subrogation and recovery of insurance claims.

2. Background of the Invention

When an insured individual submits a claim to an insurance company for costs of treatment of an injury or repairs to damaged property, the insured individual may be required to subrogate their right to sue a third party that was responsible for the injury or property damage. Using the insured's subrogated rights, the insurance company then attempts to recover amounts it paid on the behalf of the insured from any third party responsible for the injury or damage. For instance, if an insured suffers a loss as a result of an auto accident caused by another party, the insured's insurance company will pay the insured's expenses related to the loss, but may later seek to recover the cost of the expenses from the responsible party or from the responsible party's insurance company.

The first difficulty for the insurance company in attempting to recover on paid claims is that not all claims are the result of third party fault. For example, some claims may arise from costs of treatment resulting from an insured simply becoming sick. Currently, each claim or set of related claims must be examined manually to determine whether there is a third party that may be responsible for the injury or damage that resulted in the claim. This is time consuming and requires evaluation by highly skilled individuals.

Secondly, once a claim or set of related claims is selected for a recovery attempt, a processing agent must manually "work" the file in an attempt to recover on the claim or claims. This is problematic because it is time consuming and the process, methods, information gathered, scheduling, record keeping, and diligence are largely at the discretion of the processing agent. Much of the processing agent's time is spent doing clerical tasks that take away from time spent actively seeking recovery. Resources are not optimized because the decisions of each processing agent are not quantified for evaluation or education of other processing agents. As a result, recovery on similar claims may vary widely depending on the processing agent because there is no standardization of the subrogation and recovery process.

Some attempts to standardize the subrogation and recovery process through automation have been attempted, but these systems have disadvantages. For instance, prior art systems lack the ability to determine if a claim is likely to have recovery potential based on the claim data. They have no ability or standardization in gathering information about the circumstances surrounding an injury or damage that resulted in a claim. Additionally, known approaches lack the ability to update a case being processed by seeking additional claims that have been paid but are not in the case.

SUMMARY OF THE INVENTION

In accordance with the invention, there is provided a method for managing insurance claims with a computer comprising receiving data for a first insurance claim; determining from the data whether the first insurance claim has recovery potential; thereafter when it is determined that the first insurance claim has recovery potential, collecting information about the event from which the first insurance claim was derived; repeatedly seeking data, as necessary, for additional insurance claims associated with the event such that all insurance claims arising from the event are processed together.

Also in accordance with the present invention, there is provided a system for managing insurance claims with a computer comprising a memory with program instructions for causing the system to perform a method when executed, the method comprising: receiving data for a first insurance claim; determining from the data whether the first insurance claim has recovery potential; thereafter when it is determined that the first insurance claim has recovery potential, collecting information about the event from which the first insurance claim was derived; repeatedly seeking data, as necessary, for additional insurance claims associated with the event such that all insurance claims arising from the event are processed together; a processor for executing the program instructions.

Also in accordance with the present invention, there is provided a system for managing insurance claims with a computer comprising a server adapted to: receive data for a first insurance claim; and determine from the data whether the first insurance claim has recovery potential; one or more terminals connected to the server for recovery specialists to utilize in managing subrogation and recovery of insurance claims; and at least one client computer associated with an insurance company connected to the server for transferring data associated with insurance claims to the server.

Also in accordance with the present invention, there is provided a method for determining whether an insurance claim has recovery potential using a computer comprising applying one or more weights to specified portions of data associated with an insurance claim; comparing the sum of the weighted values to a threshold value.

Also in accordance with the present invention, there is provided a system for managing insurance claims with a computer comprising means for receiving data for a first insurance claim; means for determining from the data whether the first insurance claim has recovery potential; thereafter when it is determined that the first insurance claim has recovery potential utilizing, means for collecting information about the event from which the first insurance claim was derived; and means for repeatedly seeking data, as necessary, for additional insurance claims associated with the event such that all insurance claims arising from the event are processed together.

Additional features and advantages of the invention will be set forth in part in the description which follows, and in part will be obvious from the description, or may be learned by practice of the invention.

The accompanying drawings, which are incorporated in and constitute a part of this specification, illustrate embodiments of the invention and together with the description, serve to explain the principles of the invention.

It is to be understood that both the foregoing general description and the following detailed description are exemplary and explanatory only and are not restrictive of the invention, as claimed.

BRIEF DESCRIPTION OF THE DRAWINGS

FIG. 7b is a screen shot of a discovery template in accordance with the present invention.

FIG. 8b is a screen shot showing the creation or update of an expertise file according to the present invention.

FIG. 16 is a screen shot showing a projection feature according to the present invention.

DESCRIPTION OF THE EMBODIMENTS

Reference will now be made in detail to the present embodiments of the invention, examples of which are illustrated in the accompanying drawings. Wherever possible, the same reference numbers will be used throughout the drawings to refer to the same or like parts.

The present invention relates to systems and methods for managing subrogation and recovery of insurance claims. Data associated with an insurance claim is evaluated to determine whether the claim has recovery potential based, at least in part, on whether it is likely that there is a party that may be legally responsible for an event resulting in the insurance claim. After determining that a case has recovery potential, information about the event that resulted in the insurance claim is gathered. Additional claims derived from the same event may be periodically sought. Tasks that are likely to lead to recovery on the claim are created in consideration of specified attributes of the claim. The claim is assigned to a recovery specialist based on the type of claim and the expertise of the recovery specialists. All actions in bringing a claim to recovery are recorded. A projected recovery is estimated based on the type of case and applicable laws. After recovery, statistics are generated for use in managing subrogation and recovery of other insurance claims. Though the present invention is herein described primarily with respect to processing medical and liability insurance claims, the invention may be used to process any type of insurance claims.

Figure 1:
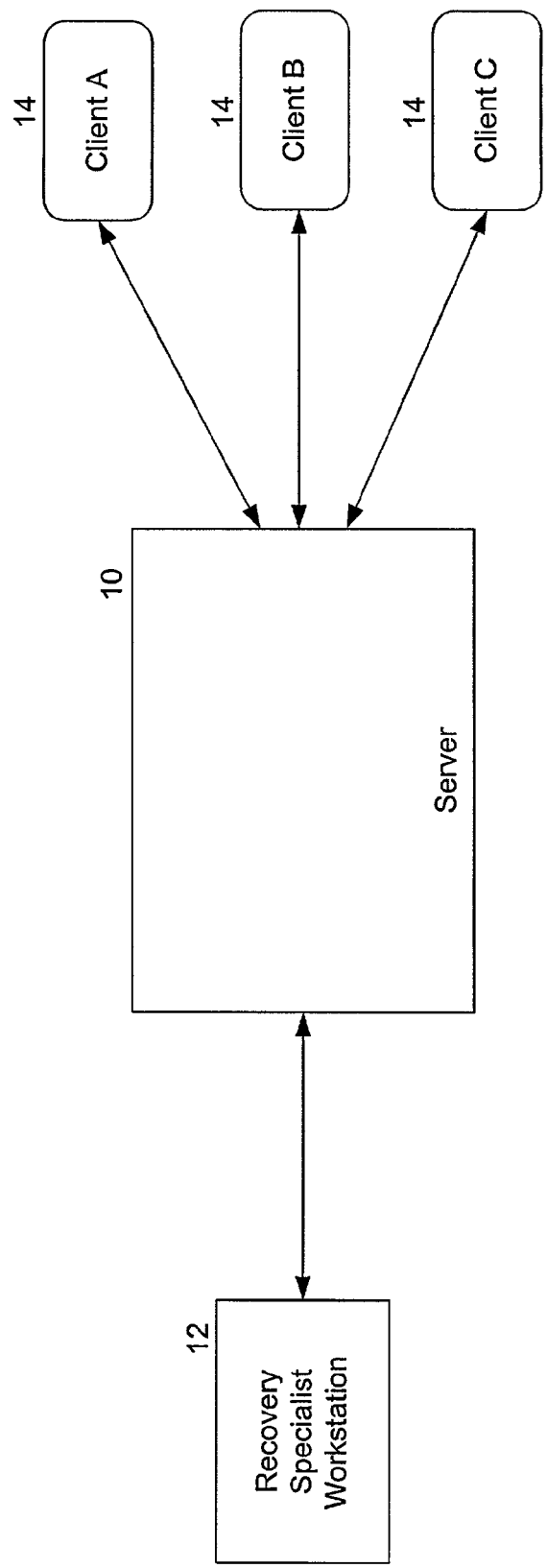
FIG. 1 is a block diagram of one embodiment of a network structure according to the present invention.
Figure 2:
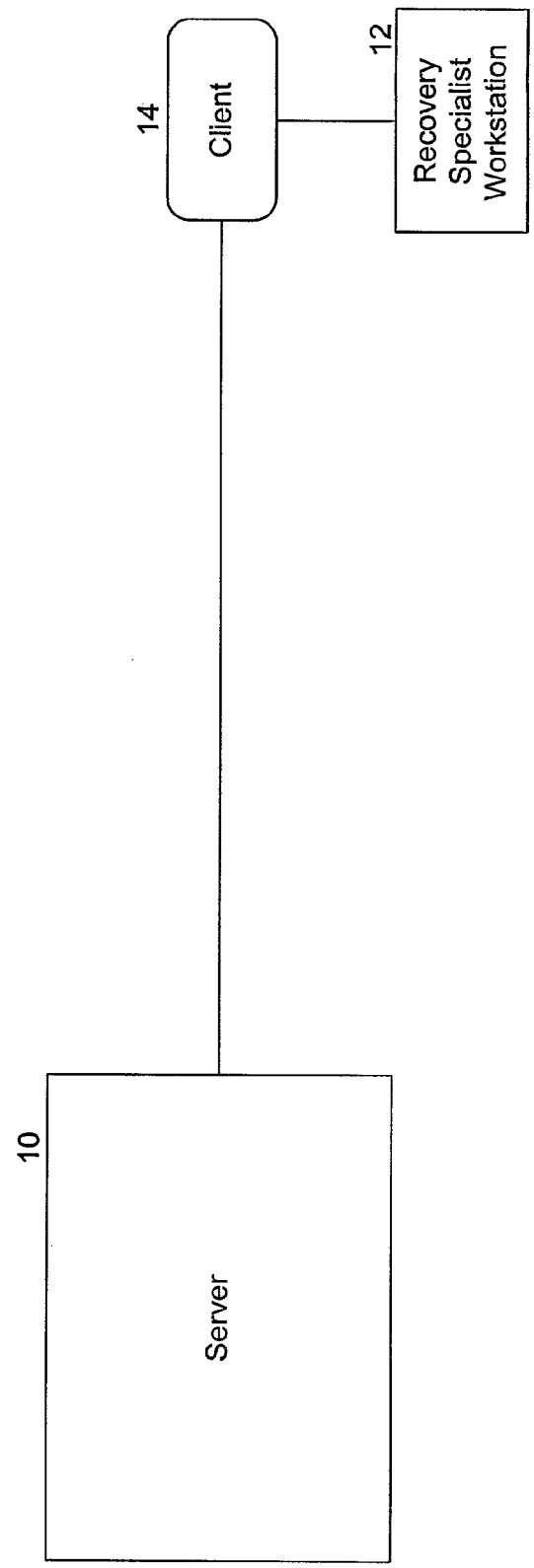
FIG. 2 is a block diagram of another embodiment of a network structure according to the present invention.
Figure 3:
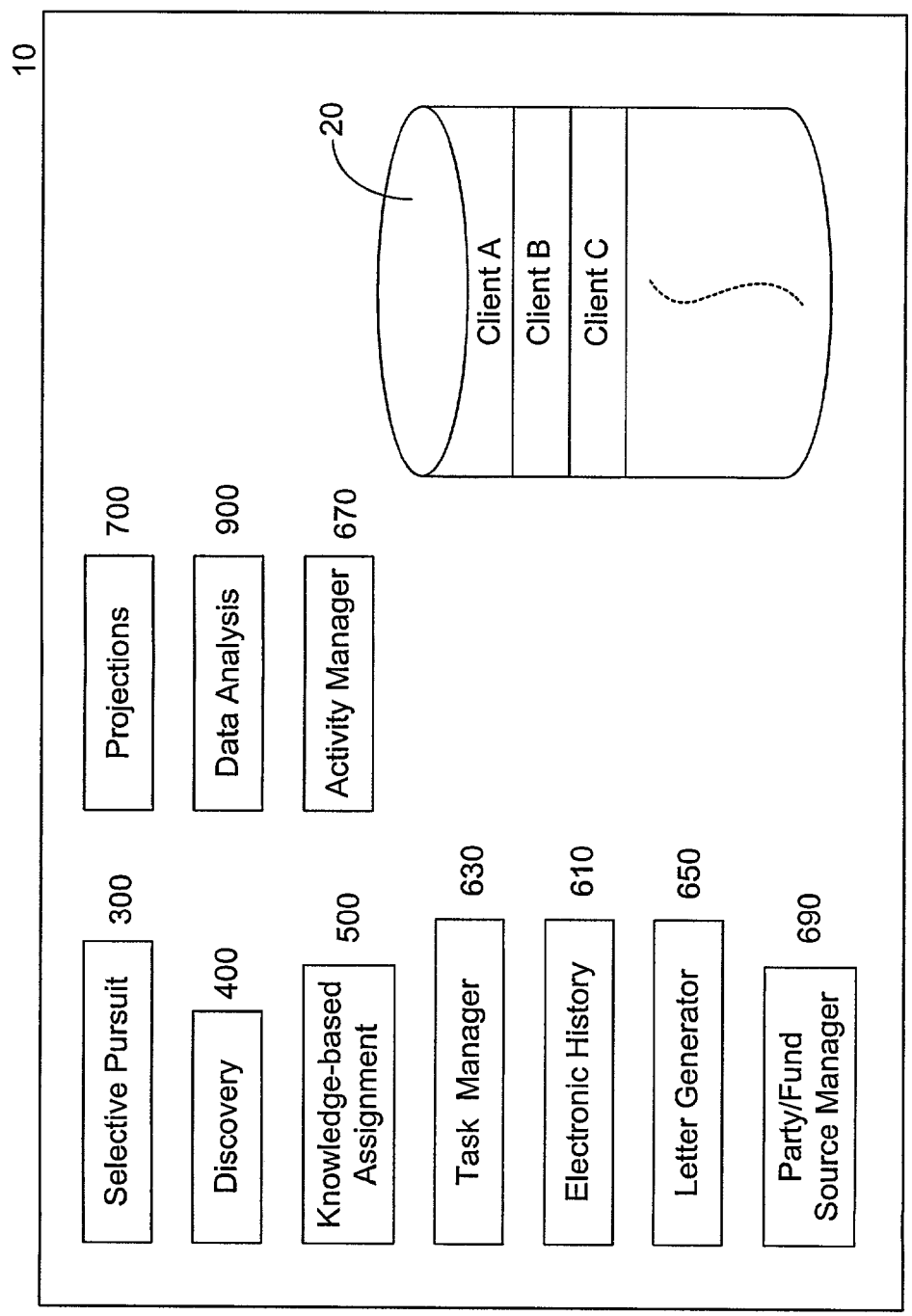
FIG. 3 is a block diagram of a server according to the present invention.

FIG. 1 is a block diagram of one embodiment of the present invention. A server 10 is connected to one or more client computers 14. The connection may be through any type of network, the web, an intranet, LAN, WAN, or a modem. The connection allows the server to request, send, and receive data associated with insurance claims. The server 10 is also connected to one or more recovery specialist workstations 12 for use by recovery specialists in managing subrogation and recovery of insurance claims. The connection may be through any type of network, the web, an intranet, LAN, WAN, or a modem. Alternatively, as shown in FIG. 2, the server 10 may only be connected to one or more client computers 14. In this configuration, a client insurance company can use internal recovery specialists to manage subrogation and recovery of insurance claims. This may be done by using recovery specialist workstations 12 connected to a client computer 14 as shown in FIG. 2 or recovery specialist workstations 12 connected to the web and using a web browser to access information stored on and utilize the functionality of server 10. Referring to FIG. 3, the server 10 has a client database 20 for storing information related to each client. The information may include claim data associated with the client, cases associated with the client, data arising from the processing of insurance claims associated with the client, data associated with cases for which recovery has been received, and client preferences and parameters for processing insurance claims associated with the client. Alternatively, information related to each client may be stored in a separate database. Additionally, server 10 includes functional capabilities, such as selective pursuit 300, discovery 400, knowledge-based assignment 500, task manager 630, electronic history 610, letter generator 650, activity manager 670, party/fund source manager 690, projections 700 and data analysis 900, all of which are described in greater detail hereinafter.

Figure 4:
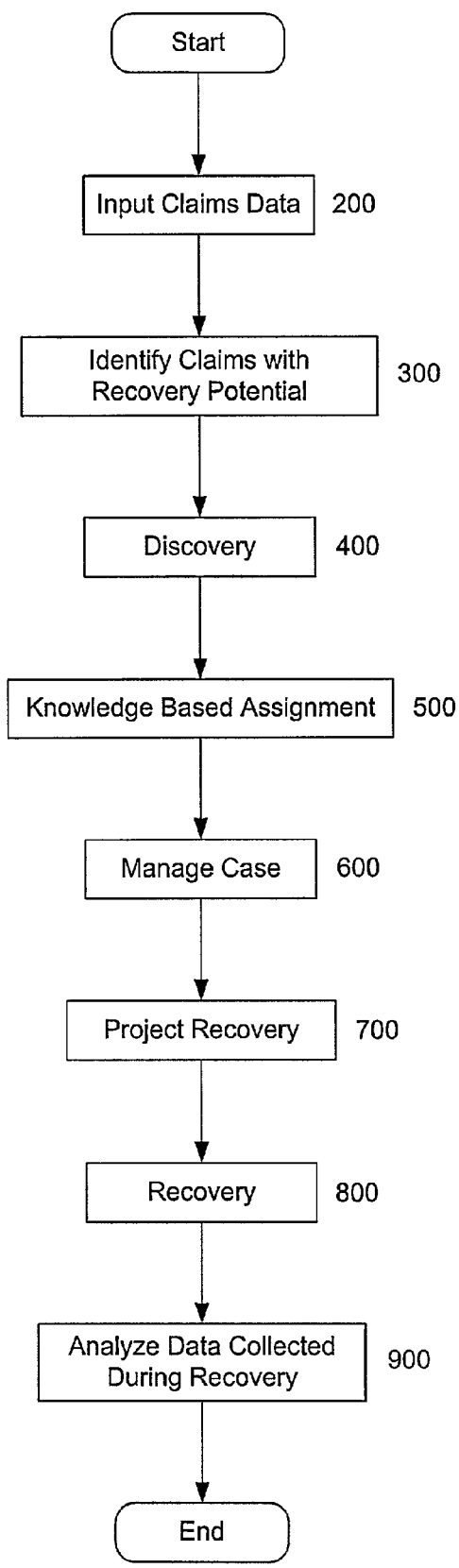
FIG. 4 is a flow diagram of a process for managing insurance claim subrogation and recovery according to the present invention.

FIG. 4 illustrates a process for managing insurance claim subrogation and recovery according to the present invention. Claim data is input into the system (step 200) and evaluated using a selective pursuit feature to identify claims with recovery potential (step 300). Claims that have been identified as having recovery potential enter a discovery process that gathers additional information about the claims (step 400). The case is then assigned to a recovery specialist using a knowledge-based assignment feature (step 500). The system then manages the case (step 600), projects a likely value of recovery (700), and facilitates receiving the recovery (step 800). The system then analyzes the data collected during the entire subrogation and recover process (step 900).

Figure 5:
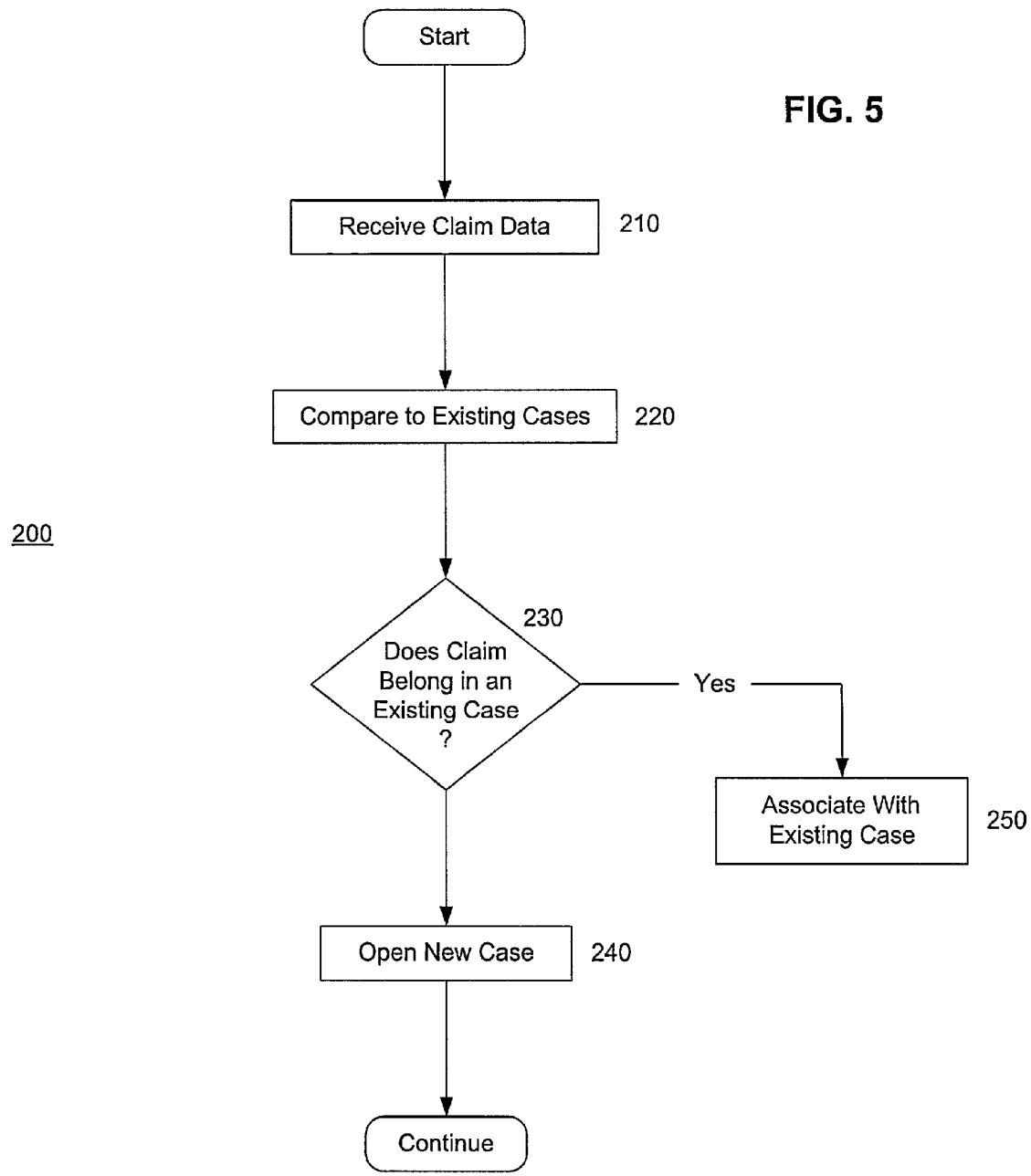
FIG. 5 is a flow diagram of a process for inputting claim data according to the present invention.

A process for inputting claim data (step 200) according to the present invention is shown in FIG. 5. Claim data generally includes at least one of a subscriber identifier, an injury or diagnosis type, such as an ICD-9 code, age of the injured person, date of injury, date of treatment, length of time from injury to treatment, recovery source, jurisdiction in which the injury occurred, client, value of the claim, type of treatment such as a treatment code, and a healthcare provider. Preferably the claim data is entered into the server 10 by receiving the data electronically from client computers 14 of insurance providers (step 210). Claims are compared to existing cases (step 220) to determine whether a claim is related to other claims in an existing case (step 230). Claims are related if they arise from or were derived from the same event. An event is an occurrence that resulted in an injury or damage that resulted in one or more claims. Generally, claims are related if specified portions of the data for the claims match or are similar. The specified portions may include subscriber identifier, date of injury, date of treatment, and injury type. If a claim does not belong in an existing case, a new case is opened for the claim (step 240). If a claim does belong in an existing case, the claim is associated with the existing case (step 250).

Figure 6:
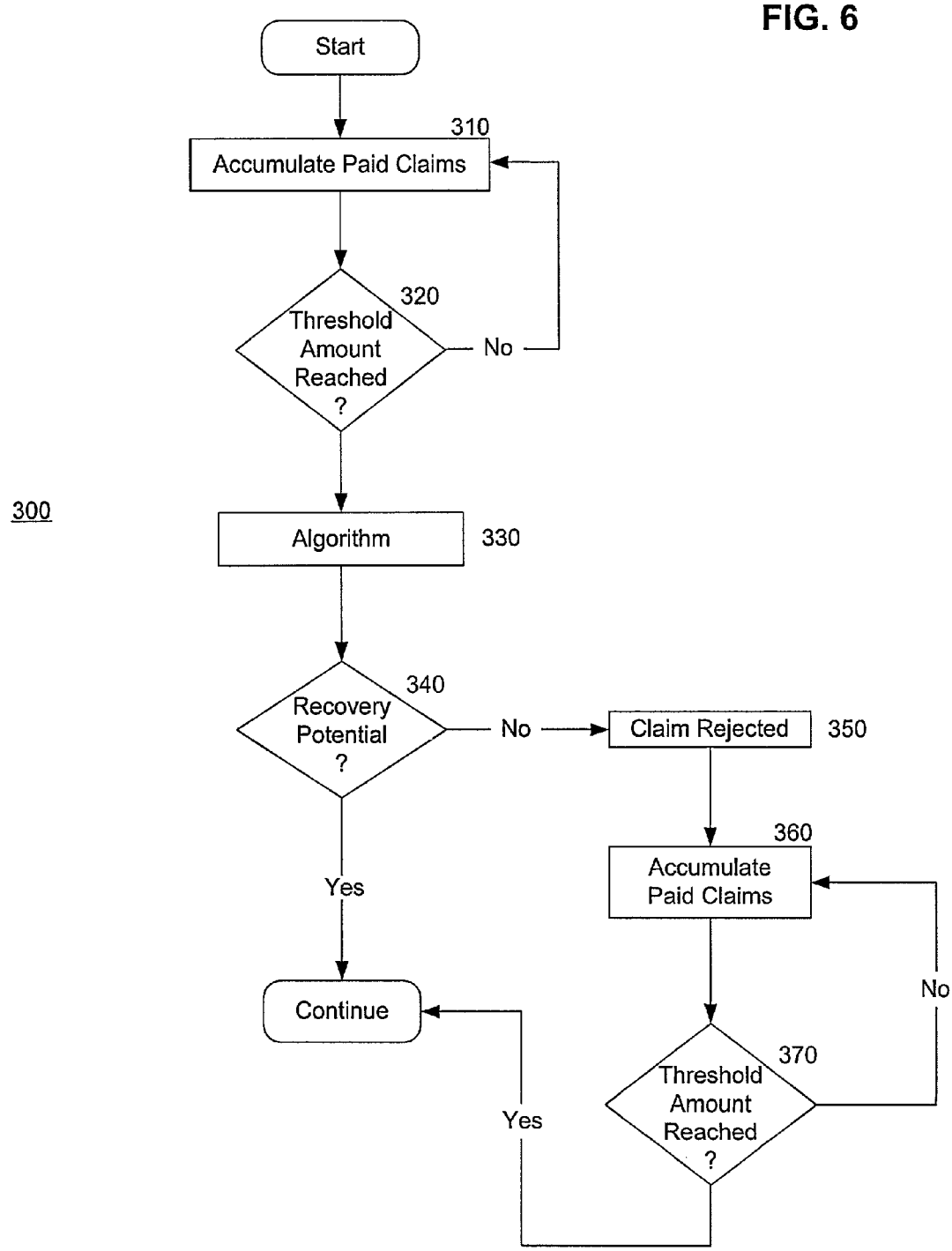
FIG. 6 is a flow diagram of a process for identifying claims with recovery potential according to the present invention.
Figure 7A:
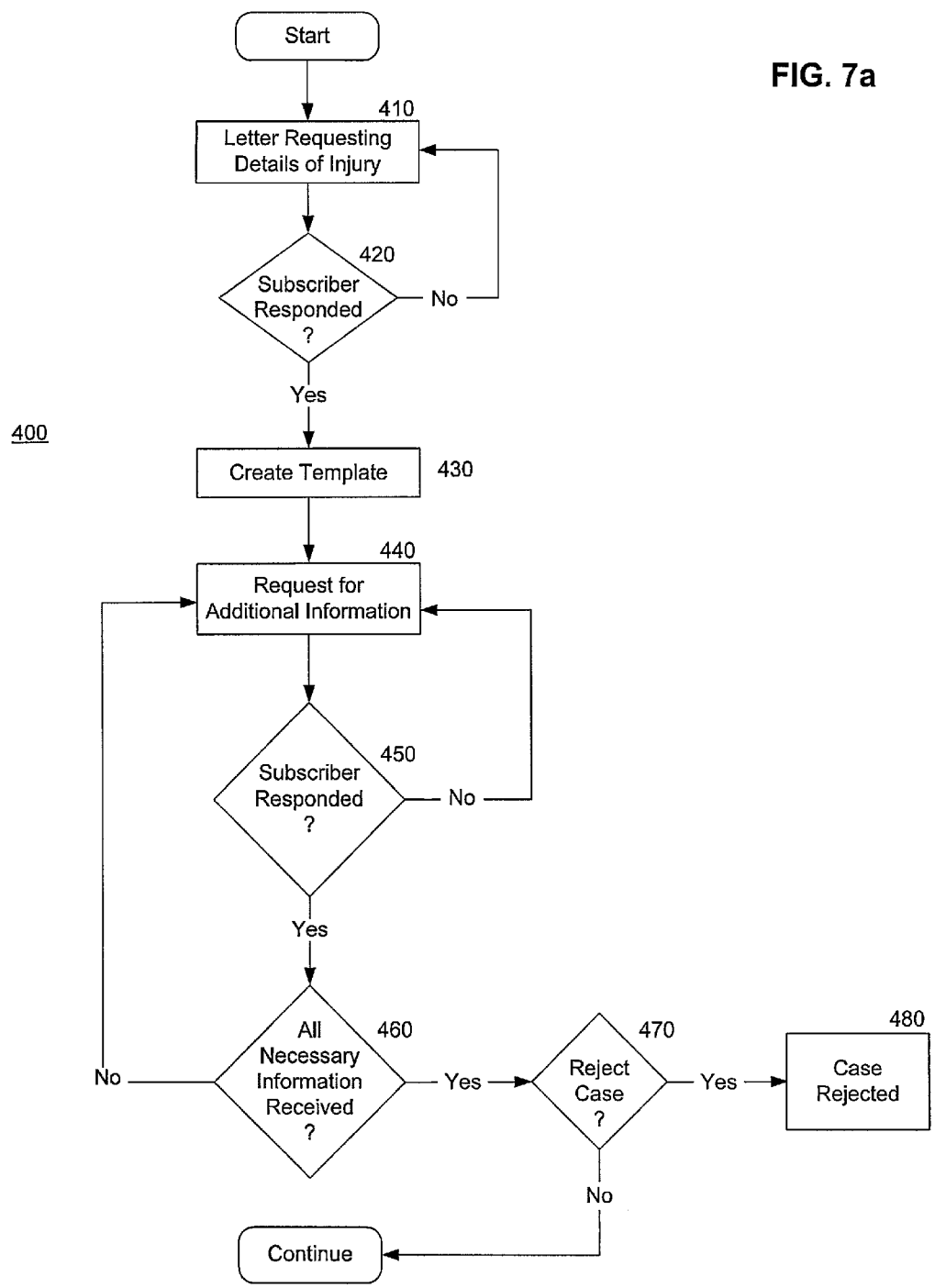
FIG. 7a is a flow diagram of a discovery process according to the present invention.

Referring to FIG. 6, a process for identifying claims with recovery potential (step 300) according to the present invention is shown. Each new case is evaluated using a selective pursuit feature to determine if any of the claims in the case have attributes that indicate that the case has recovery potential. All new cases enter a staging area in which the case can accumulate additional paid claims (step 310) related to the case that are received from a client computer. The system periodically compares the amount of paid claims in the case against a threshold amount (step 320). The threshold amount is a dollar amount defined by a client, above which a case is economically worthwhile to pursue. The threshold amount may depend on the client or the type of case. If the threshold amount has not been reached, the case continues to accumulate paid claims (step 310). If the threshold amount is reached, an algorithm is applied to the claims in the case (step 330). The algorithm is a formula that determines whether any of the claims in a case is likely to lead to recovery based on information in the claim data. Recovery is possible if there is a party that may be legally responsible for the injury or damage resulting in the claims. The algorithm considers specified portions of the claim data such as a diagnosis code, age at the time of the injury, and length of time between the injury and treatment to determine whether the claim is of the type for which recovery is likely to be possible. A particular weight is assigned to each specified portion of the claim data to achieve a series of weighted values. The sum of the weighted values is compared to a threshold value. If the sum of the resulting weighted values is above the threshold value, the claim has recovery potential. If the sum of the resulting weighted values is below the threshold value, the claim has no recovery potential. The weight applied to a particular factor is based on the value of that factor in cases that have been recovered on in the past. Likewise, the threshold value is based on the value of the sum of weighted values in cases that have been recovered on in the past. For example, the presently preferred algorithm for trauma injuries is $(-1.317728)+(-0.000468\times(\text{age at time of injury})\times(\text{age at time of injury}))+(0.0330333\times(\text{age at time of injury}))+(1.12453577\times(\text{time between injury and treatment}))+(-0.3917884\times(\text{time between injury and treatment})\times(\text{time between injury and treatment}))=\text{sum of weighted values}$. If the sum of the weighted values is less than $-0.85$, the claim has no recovery potential. If any of the claims in a case are determined to have recovery potential, the case as a whole is assumed to have recovery potential. Based on the results of the algorithm (step 330) the system determines whether the case has recovery potential (step 340). If the case is determined to have recovery potential, the discovery process (step 400) shown in FIG. 7*a* is initiated. If the case has no recovery potential, the case is rejected (step 350). The rejected case may continue to accumulate paid claims (step 360). The system may periodically compare the value of claims in the rejected case to a second threshold amount (step 370). If that threshold has not been met, the rejected case continues to accumulate paid claims (step 360). If the second threshold amount has been reached, the case enters the discovery process (step 400) shown in FIG. 7*a*, despite having been determined to have no recovery potential by the algorithm (step 330).

Figure 7B:
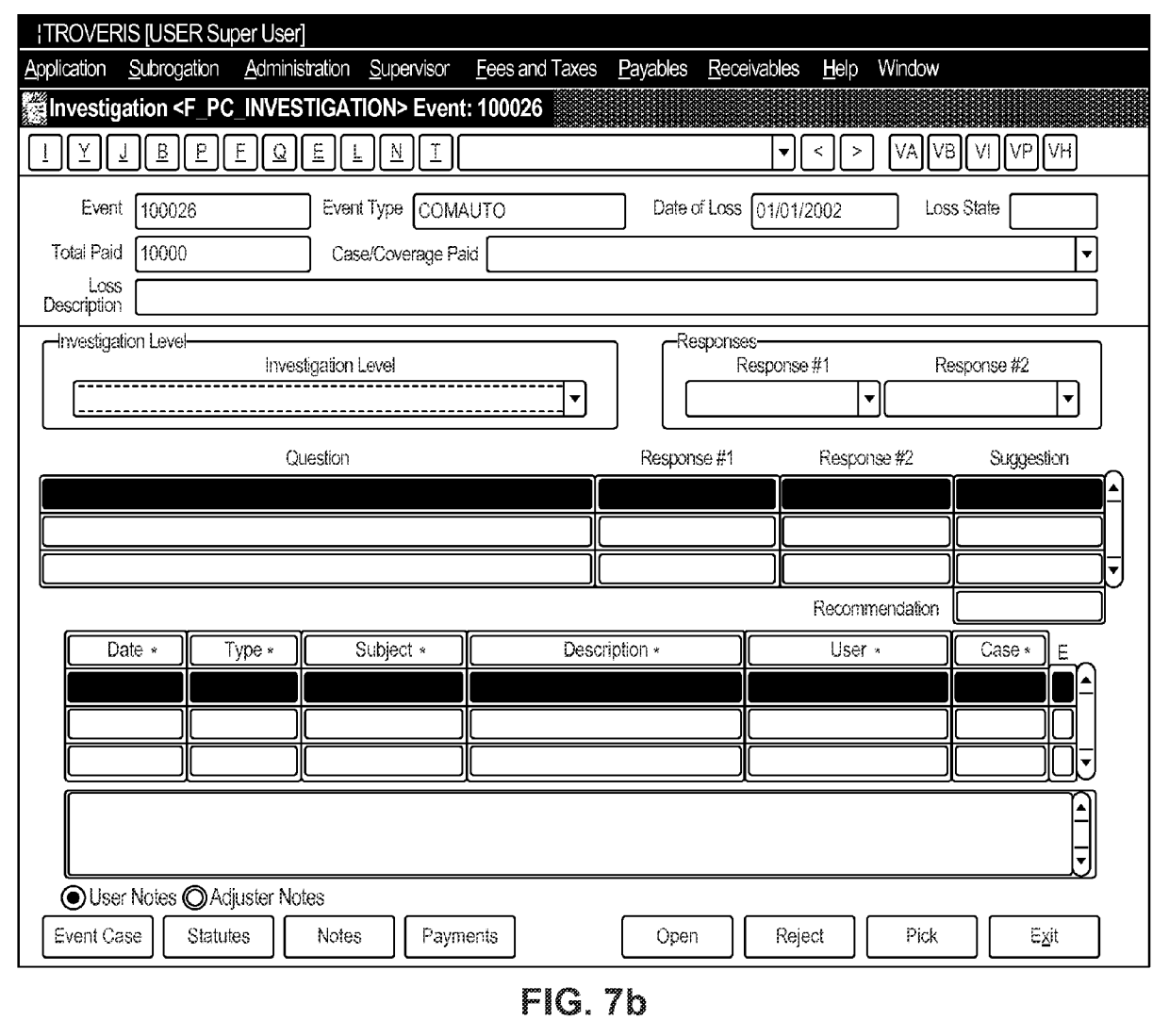

A discovery process (step 400) gathers information about a case needed to pursue a case to recovery and to make an informed decision about whether to continue pursuing recovery in a case. Referring to FIG. 7*a*, a letter requesting the details of the injury resulting in one or more claims is generated and sent to the insurance subscriber (step 410). This letter generally asks the subscriber to call, write a letter, or fill out a questionnaire explaining the type of injury and how it occurred. The system monitors whether the subscriber has responded (step 420). If the subscriber has not responded, the system generates and sends another letter requesting details of the injury (step 410). Though this process may continue indefinitely, generally only four letters are sent, the fourth letter being a letter from an attorney. If the subscriber responds either by calling or by letter, a clerical worker enters information from the subscriber's response into the system. A template of information required to process a case and determine whether to continue to pursue recovery is created (step 430). The template is created in consideration of information about one or more claims in the case such as the subscriber's response to the letter requesting details and circumstances surrounding the injury and specified criteria such as injury type, age of the injured person, date of injury, date of treatment, length of time from injury to treatment, recovery source, jurisdiction in which the injury occurred, client, value of the first insurance claim, and type of treatment. FIG. 7*b* is a screen shot of a discovery template in accordance with the present invention. Next, the system generates and sends a request for additional information seeking information required by the template (step 440). The request for additional information may be a letter to the subscriber or a telephone script for use by a telephone operator in contacting the subscriber. The request for additional information generally begins with general questions that progressively narrow in scope to obtain a description of the event that led to the claims in the case, the effect on client contract and laws, parties involved, attorneys, and sources of funds. If the subscriber does not respond to the request for additional information (step 450), the request for additional information is repeated (step 440). If the subscriber does respond (step 450), the system determines whether all necessary information has been received (step 460). When additional information is still required, the system evaluates what additional information is needed and generates another request for that additional information (step 440). If all the required information has been received, the system decides whether to pursue or reject the case based on information gathered during discovery (step 470). Cases are rejected if the information gathered during discovery indicates that applicable laws would bar recovery, the injury is of the type for which there is no legally responsible party to recover from, or the information gathered is inconsistent with client preferences. If the system determines that the information gathered about the case indicates that recovery will not be possible or the type of case is not one in which the subrogation should be pursued, the case is rejected (step 480). If the system does not reject the case, the case is assigned to a recovery specialist using the knowledge-based assignment process (step 500) shown in FIG. 8*a*.

Figure 8A:
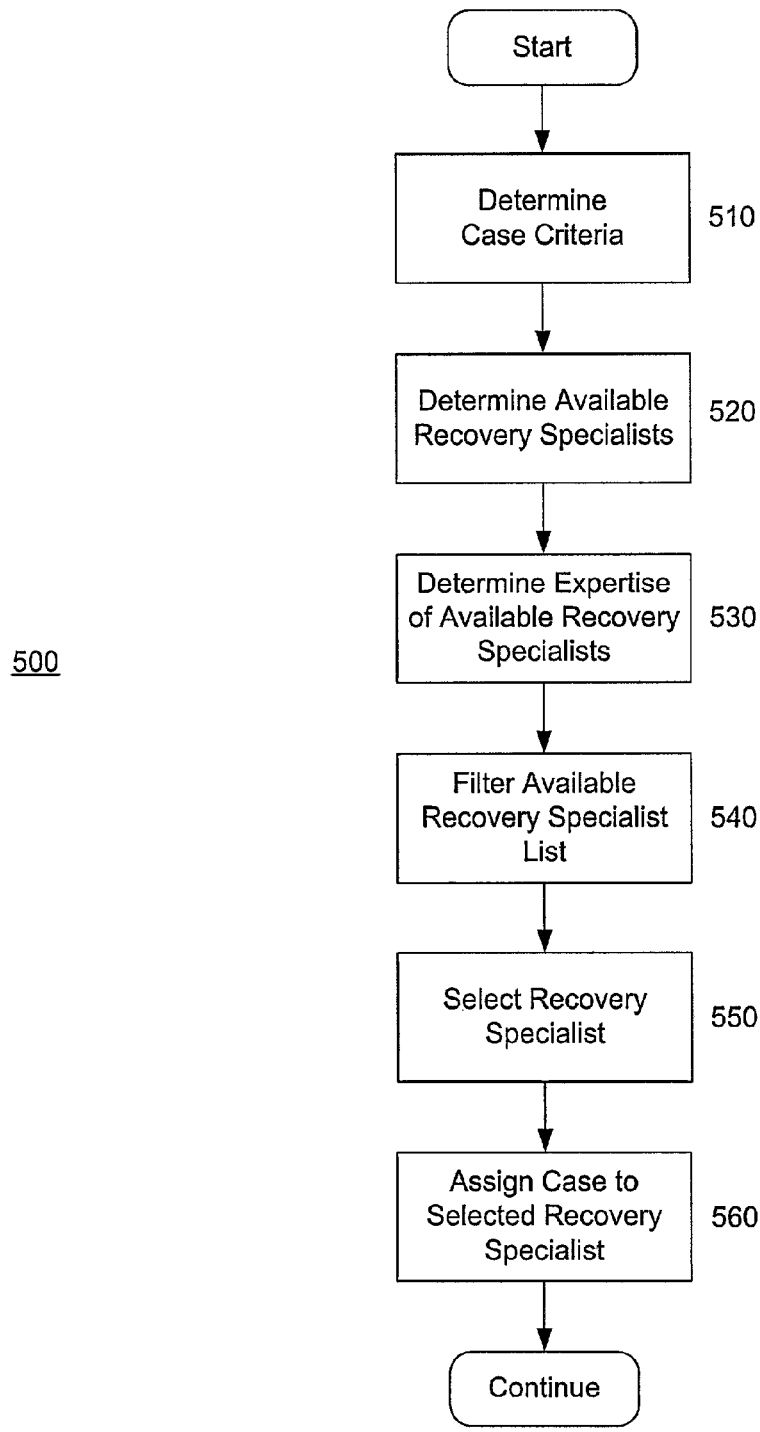
FIG. 8a is a flow diagram of a knowledge-based assignment process according to the present invention.
Figure 8B:
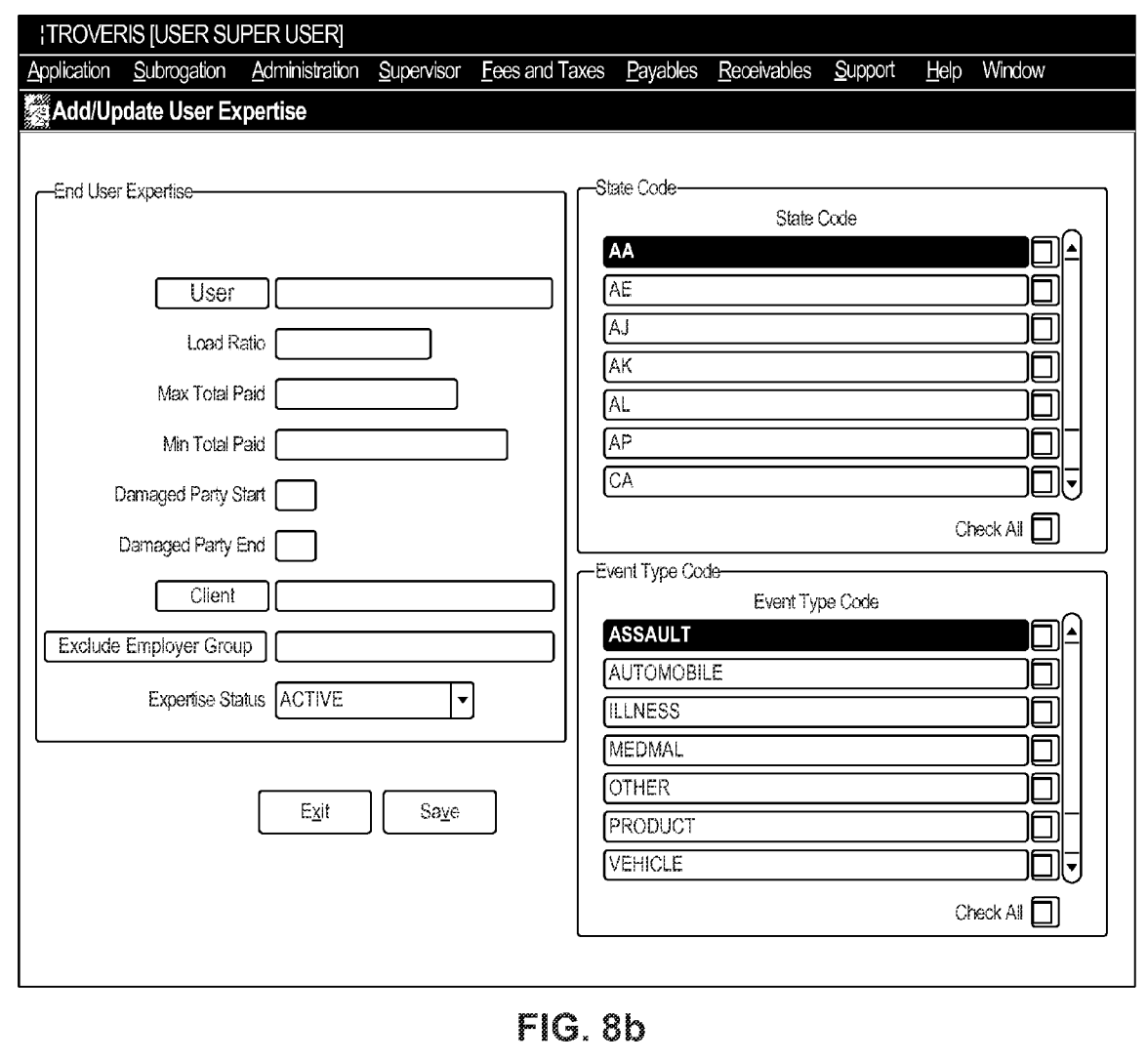

The knowledge-based assignment process (step 500) maximizes resources by optimally assigning cases to recover specialists based on the criteria of the case, workload, and expertise of the recovery specialist. A recovery specialist is anyone involved in the processing of insurance claims. Referring to FIG. 8*a*, the knowledge-based assignment process first determines specified case criteria (step 510). The relevant case criteria may include an injury type, age of the injured person, date of injury, date of treatment, length of time from injury to treatment, recovery source, jurisdiction in which the injury occurred, client, value of the insurance claims in the case, and type of treatment. Next, the system determines available recovery specialists by comparing each specialist's current workload against their maximum workload level and selecting those that can accept additional work (step 520). Then the system determines the expertise of the available recovery specialists by evaluating the expertise file of the available recovery specialists (step 530). An expertise file containing various limits and authorizations is maintained for each recovery specialist. The expertise file may contain maximum workload level for the recovery specialist, the states or jurisdictions in which the recovery specialist is proficient in laws regarding subrogation and recovery, minimum and maximum dollar values for which the recovery specialist is authorized, injury types for which a recovery specialist is authorized, and particular clients for which a recovery specialist is authorized to work. FIG. 8b is a screen shot showing the creation or update of an expertise file according to the present invention. After determining the expertise of available recovery specialists (step 530), the system filters the available recovery specialists to determine the available recovery specialist whose expertise file most closely matches the determined case criteria (step 540). Based on the filtering process (step 540), the system selects a recovery specialist (step 550) and assigns the case to the selected recovery specialist (step 560). If the case criteria changes such that the case criteria are no longer consistent with the expertise of the assigned recovery specialist, the case may automatically be reassigned using the knowledge-based assignment process (step 500) shown in FIG. 8 and described above.

Figure 9:
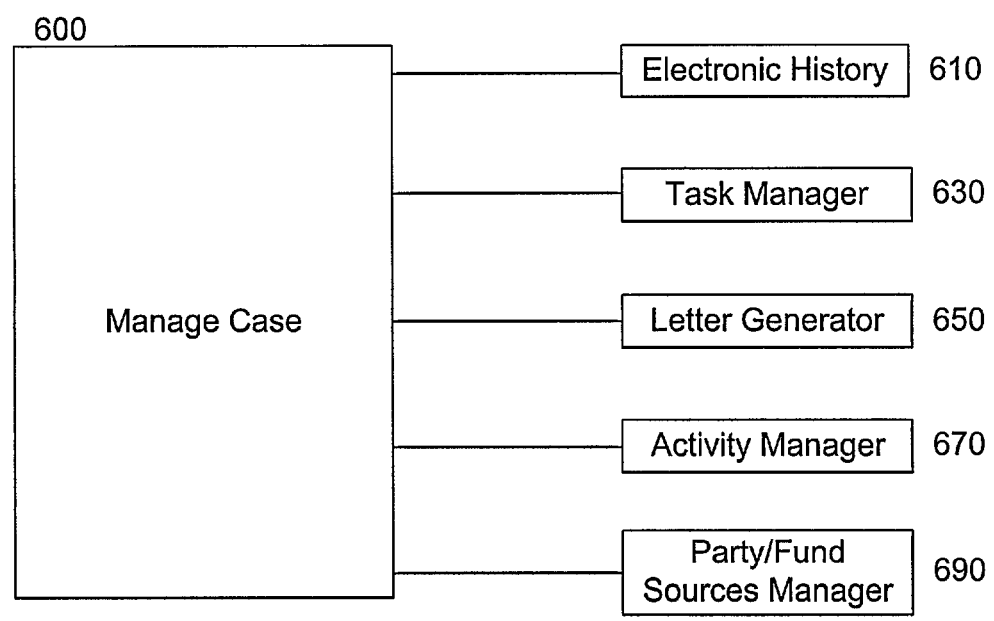
FIG. 9 is a block diagram of features used in managing a case according to the present invention.

As shown in FIG. 9, the system then assists recovery specialists in managing the case (step 600) using an electronic history feature 610, task manager 630, letter generator 650, activity manager 670, and a party/fund source manger 690, each of which features are described hereinafter.

Figure 10:
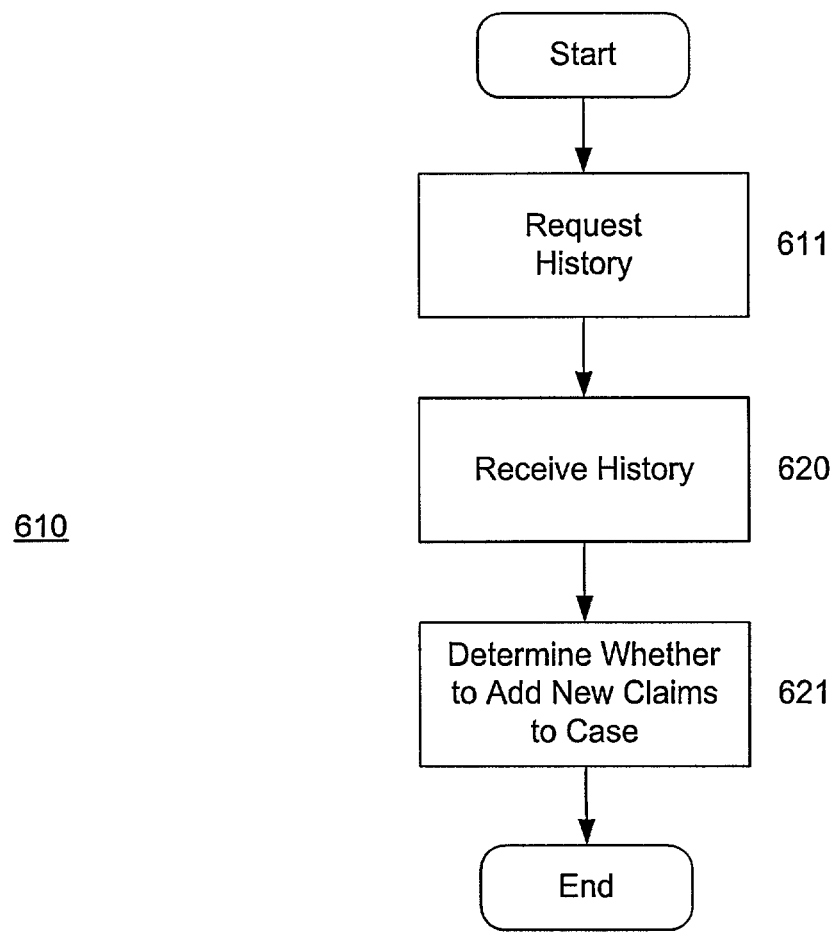
FIG. 10 is a flow diagram of an electronic history feature according to the present invention.

The electronic history feature 610 shown in FIG. 10 seeks additional claims related to a case that have been paid after the case has begun to be processed. This ensures that all related claims are processed together and that a case does not settle when all paid claims are not included in a settlement agreement. The electronic history feature executes a process comprising requesting history from a client (step 610), receiving a history file from the client (step 620), and determining whether to add claims in the history file to the case (step 621).

Figure 11:
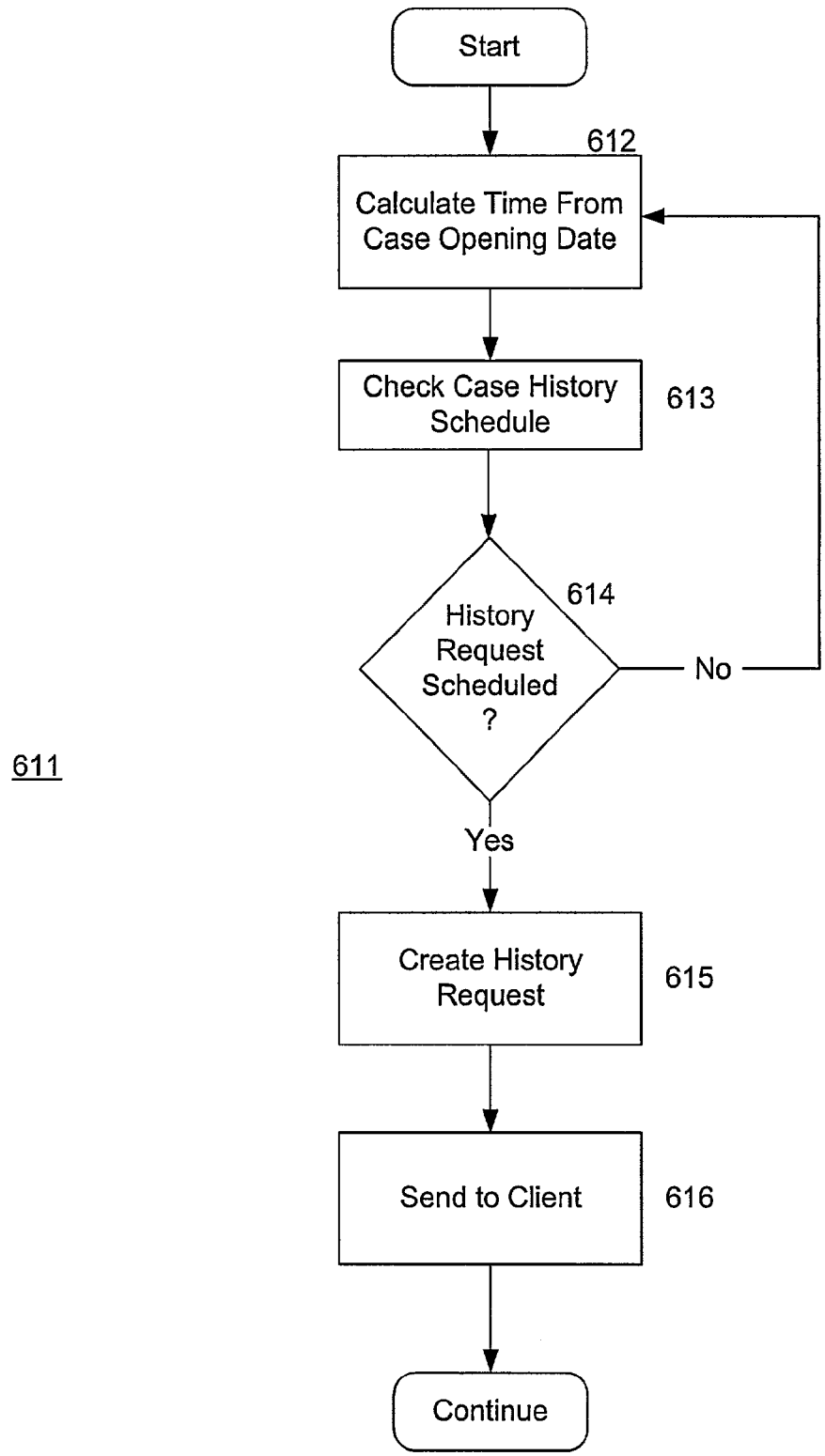
FIG. 11 is a flow diagram of a scheduled history request procedure according to the present invention.

History files may be requested upon demand by a recovery specialist, may be requested periodically pursuant to a schedule, or may be requested in response to certain actions by the system or a recovery specialist. FIG. 11 is a flow diagram of a scheduled history request according to the present invention. First, the system calculates the time from the opening date of the case to the present date (step 612). The history schedule is then checked (step 613) to determine whether a history request is scheduled (step 614). If a history request is not scheduled, the process is periodically repeated. If a history request is scheduled, a history request is created (step 615). The history request seeks related claims. The request may seek all related claims or only related claims having a particular diagnosis code. Additionally, the request preferably seeks only those claims which were paid within a specified time period surrounding the date of injury identified in the claims already in the case. The request is then sent to the client insurance company electronically (step 616).

Figure 12:
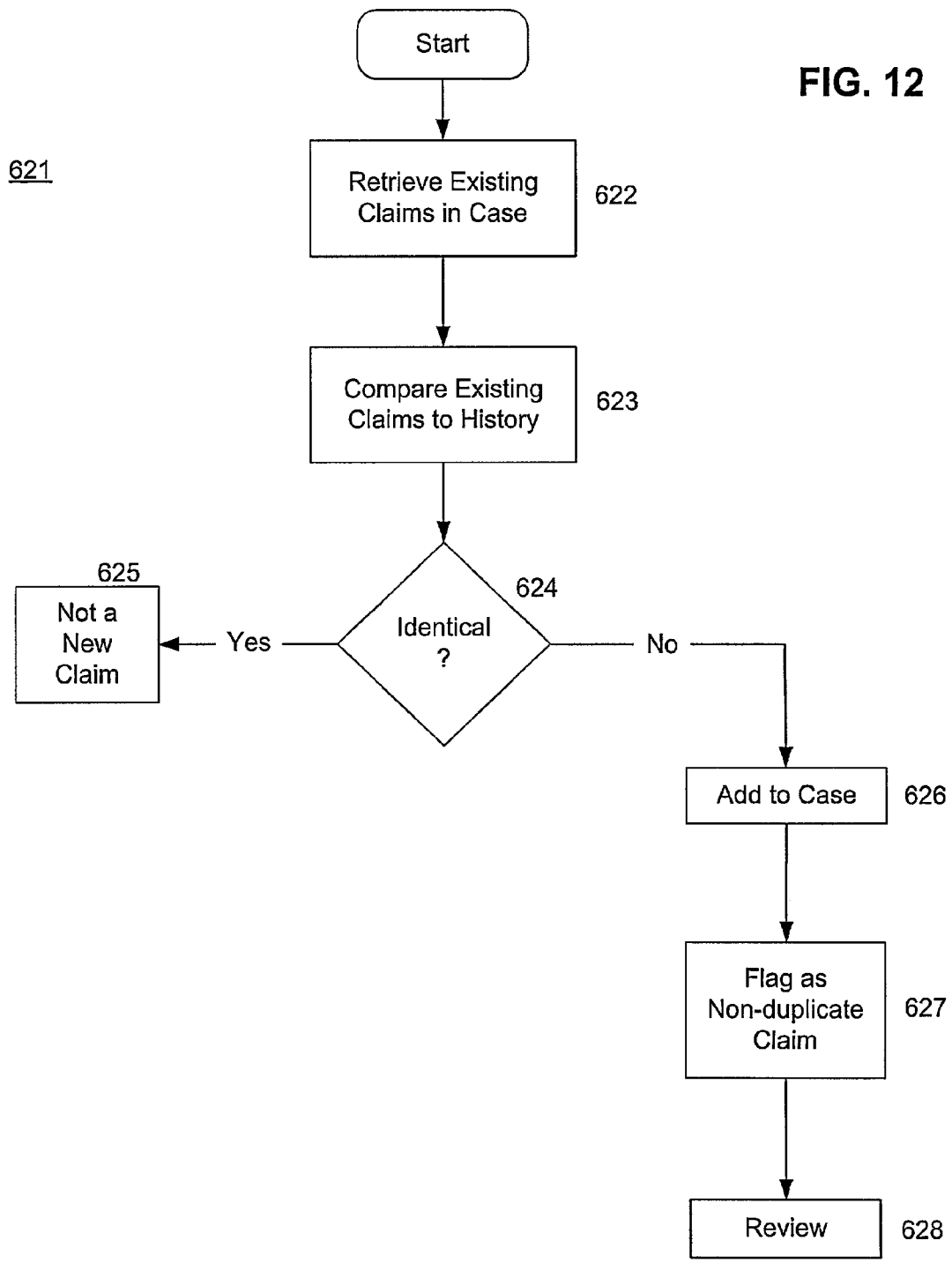
FIG. 12 is a flow diagram of a process for determining whether to add new claims to a case according to the present invention.

After electronically receiving the history file in response to the history request (step 620), the system determines whether to add new claims in the history file to the case (step 621). A history file comprises data for claims for a particular subscriber from a specified time period. Referring to FIG. 12, the existing claims in a case are retrieved (step 622) and compared to each of the claims in the history file (step 623). The system then determines if the any of the claims in the history file are identical to claims in the case (step 624). This may be done for example, by evaluating whether the date of treatment, bill amount, and treatment code for any claim in the history file match the same those for any claim already in the case. If a claim in the history file is identical to any of the existing claims in the case, the claim in the history file is not a new claim. If a claim in the history file is not identical to any of the existing claims in the case, the claim is added to the case (step 626) and flagged as a non-duplicate claim (step 627). The new claims are then reviewed by a recovery specialist to ensure that the new claims are related to the other claims in the case (step 628). The electronic history feature 610 also allows a recovery specialist to access a client computer 14 to view claim data stored on the client computer regardless of the system or format used by the client computer. The electronic history feature 610 captures the image of the screen displayed in the format of the client computer, recognizes the relevant information, and imports the data into an electronic history file.

Figure 13:
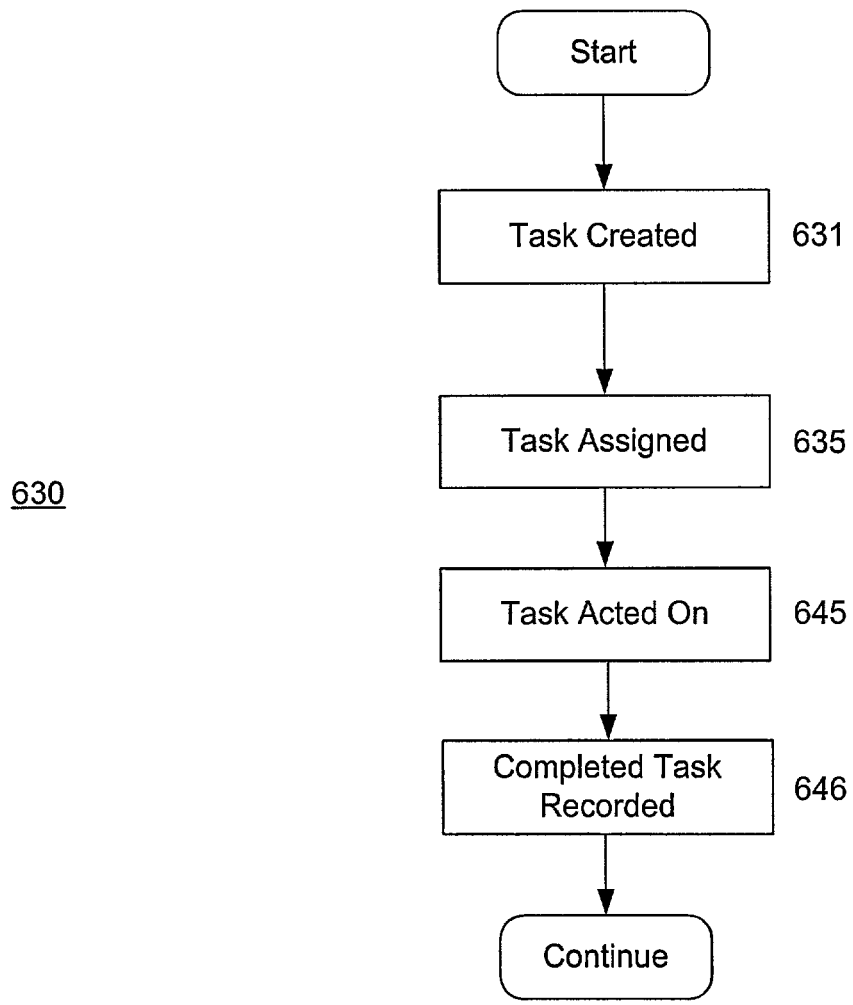
FIG. 13 is a flow diagram of a task manager procedure according to the present invention.
Figure 14:
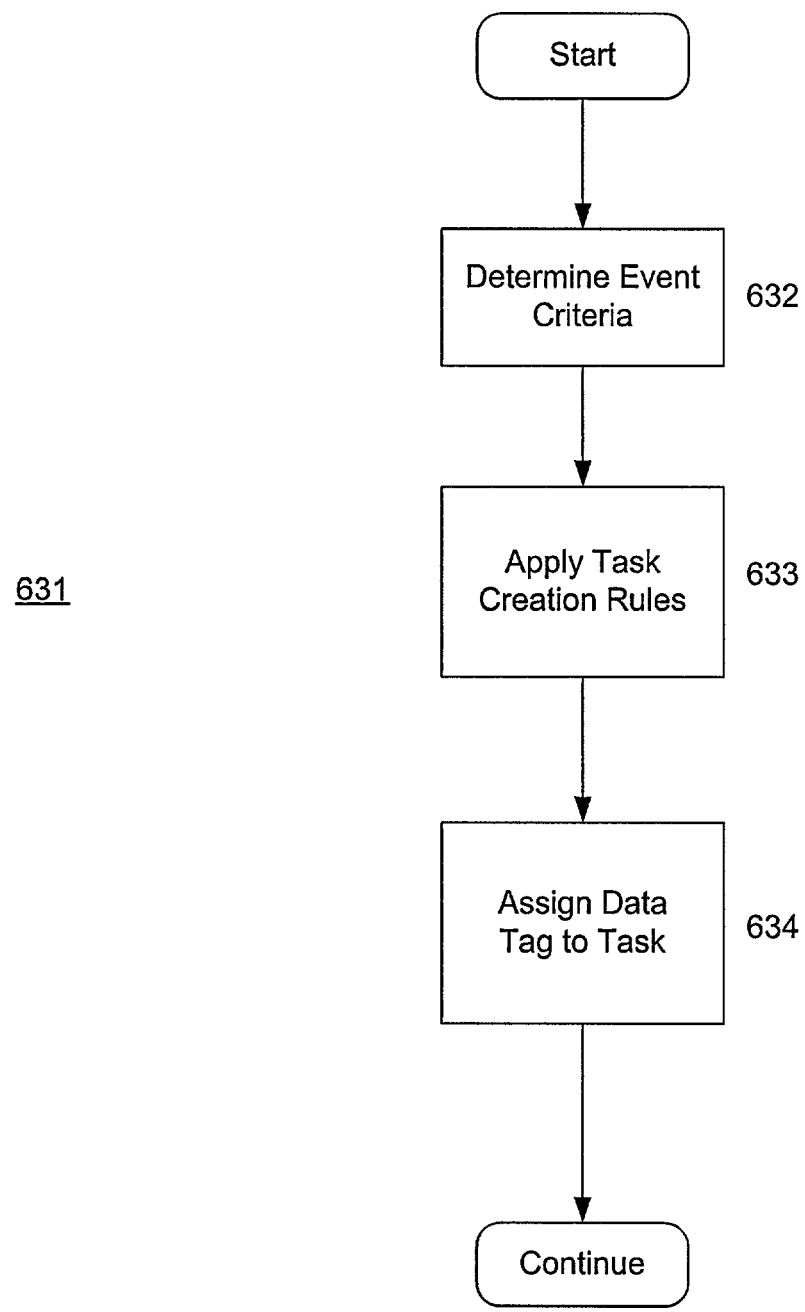
FIG. 14 is a flow diagram of a process for creating tasks according to the present invention.

The task manager 630 organizes and provides standardization of the subrogation and recovery process. It suggests actions to take that are most likely to lead to recovery and presents the actions to recovery specialists in a way that allows them to organize their recovery efforts. As shown in FIG. 13, tasks are created (step 631), assigned to recovery specialists (step 635), acted on (step 645), and recorded (step 646). Tasks are actions used to bring a case to the point of recovery such as phone calls, letters, case reviews, attorney referrals, etc. Tasks may be actions to be completed by or at the direction of recovery specialists or actions to be performed automatically by the system. Though tasks may be created by a recovery specialist, FIG. 14 shows a process of automatically creating tasks (step 631) according to the present invention. When a new case is processed, the system creates a list of tasks that are likely to bring a case to recovery. Tasks are created by determining specified case criteria (step 632), applying task creation rules (step 633), and assigning a data tag to the task (step 634). The specified case criteria comprises data that describes the type of case including at least one of a subscriber identifier, an injury or diagnosis type such as an ICD-9 code, age of the injured person, date of injury, date of treatment, length of time from injury to treatment, recovery source, jurisdiction in which the injury occurred, client, value of the claim, type of treatment such as a treatment code, possible fund sources, a healthcare provider, and possible recovery fund sources. The task creation rules create a list of tasks in consideration of the determined case criteria. The task creation rules are a combination of industry best practice and client preferences. Industry best practice is based on historical data and management and recovery specialist experience. For example, if a case has claims resulting from treatment for head trauma resulting from an auto accident, the task creation rules create a task to request a police report of the accident. After applying the task creation rules (step 633), each task is assigned a data tag containing information about the task (step 634). This information may include an identifier of the associated case, a client identifier, a task type and a task description.

Figure 15:
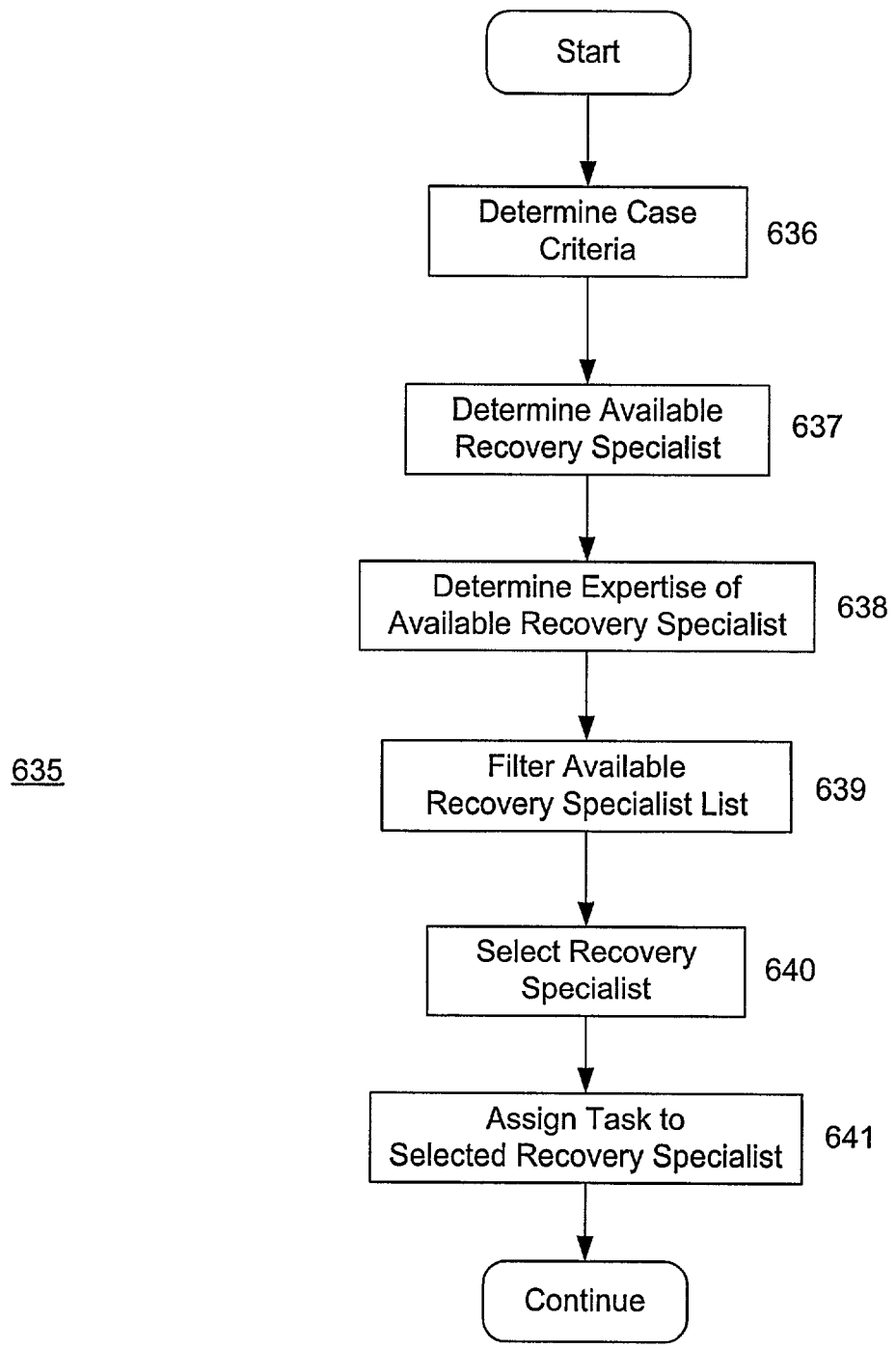
FIG. 15 is a flow diagram of a process for assigning a task according to the present invention.

Tasks may be assigned to the recovery specialist to which the associated case has been assigned. The tasks can then be acted on by that recovery specialist (step 645) or reassigned to another recovery specialist. Alternatively, tasks may be assigned (step 635) or reassigned using the process shown in FIG. 15. The process comprises determining the case and task criteria (step 636), determining available recovery specialists (step 637), determining the expertise of available recovery specialists (step 638), filtering the available recovery specialist list (step 639), selecting a recovery specialist (step 640), and assigning the task to the selected recovery specialist (step 641). Tasks are assigned to recovery specialists by placing the tasks in an electronic in-box that displays tasks that currently need attention. The recovery specialist then acts on an assigned task by accepting and completing the task or reassigning the task (step 645). Completed tasks are then recorded (step 646).

The following example illustrates some features of the task manager. A case is assigned to a recovery specialist. A list of tasks is created that are likely to bring the case to recovery in the shortest period of time. The first task may be for the system to automatically create and send a history request. When the results of the history request are received, the system may inform the recovery specialist and execute a second task of determining contact information for insurance companies and attorneys associated with all parties. If no insurance company or attorney contact information is determined, a task may be presented to the recovery specialist to retrieve that information. Once contact information is determined, the next task executed may be to automatically generate letters or emails informing the parties of an intention to recover and send or fax the correspondence to the parties. Additionally, the recovery specialist may be presented with a task to call the parties on the telephone. The recovery specialist can view the complete process through a diagram showing all tasks including the task currently requiring action. The system can be configured so that tasks carried out automatically can require the recovery specialists approval before completion.

Referring again to FIG. 9, an activity manager 670 records all actions taken in a case in an activity log maintained for the case. Information related to actions taken by the system or a recovery specialists is automatically recorded in the activity log. The information may include a description of the action, the actor, images of any documents received or sent, and when the action occurred.

A letter generator 650 assists in managing a case. The letter generator 650 automatically or at the request of a recovery specialist generates correspondence to facilitate the processing of a case. The correspondence created is tailored to the relevant jurisdiction's laws and the particular situation for which the correspondence is required. The letter generator may be specific to each client by for instance generating letters with the clients logo using stored images or graphics. The letter generator may also be capable of generating emails. Letters that are generated can be automatically sent electronically, by fax, or printed and sent by mail.

A party/fund source manger 690 maintains contact information for all parties and fund sources in a case. Additionally, it maintains information about how all parties involved in a case are related.

Figure 16:
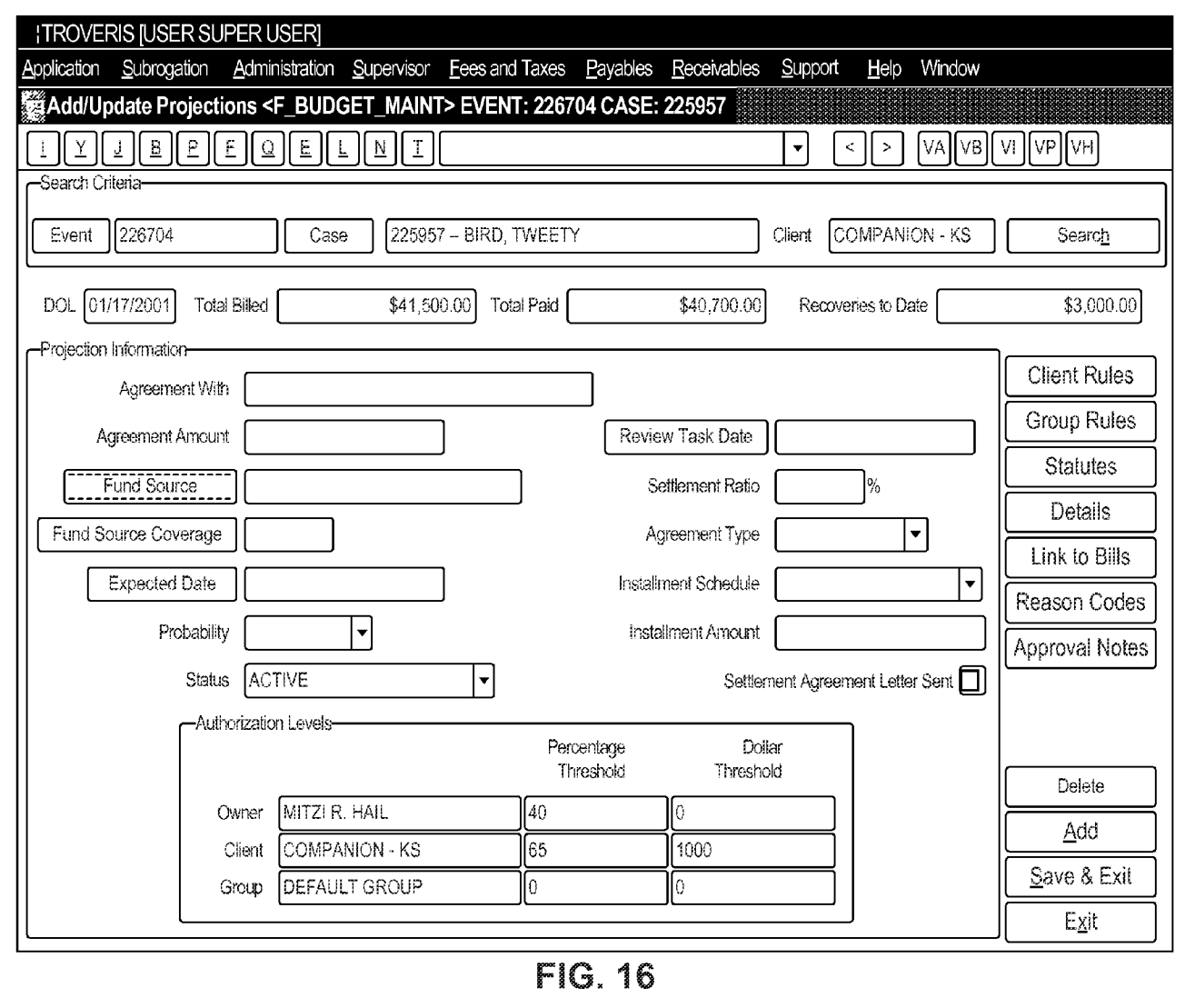

FIG. 16 is a screen shot showing a projection feature according to the present invention. The projection feature (FIG. 4, step 700) provides an estimate of the amount of recovery that may be expected in a case. Historical recovery data, applicable laws, and specified case criteria are used to estimate a recovery amount, expected date of recovery, and probability that the projected recovery will be received by the expected date of recovery. Case criteria may include at least one of a subscriber identifier, an injury or diagnosis type such as an ICD-9 code, age of the injured person, date of injury, date of treatment, length of time from injury to treatment, recovery source, jurisdiction in which the injury occurred, client, value of the claim, type of treatment such as a treatment code, possible fund sources, a healthcare provider, and possible recovery fund sources. The case criteria are used to determine a projected recovery by evaluating the amount of recovery in cases with similar case criteria that have been previously processed. Applicable laws, such as statutory recovery limits or laws prohibiting subrogation of certain types of claims, are then used to adjust the projected recovery accordingly. For example, if a case has claims worth $5,000 arising from an automobile accident caused by a third party, the third party has insurance coverage for $4000, the third party's only other asset is a primary residence, and the jurisdiction in which the accident occurred bars attacking a primary residence to fulfill a judgment, the projection feature may project that there is a 70% chance of recovering $4,000 within 6 months.

After receiving recovery, data collected throughout the recovery process is analyzed (FIG. 4, step 900). The data collected may be used to change discovery templates, change the selective pursuit algorithm, or generate management statistics. The discovery template may be changed to include a request for information that may be helpful in processing a particular type of case. The algorithm may be changed to reflect new experience and further refine the weights and threshold value. The data may be used to generate management statistics that are used to determine the efficiency of all aspects of the recovery process. This may include measuring the efficiency of recovery specialists, the cost effectiveness of certain actions and the value of processing certain types of cases. For instance, the data may be used to calculate a ratio of the total number of claims processed to the number of claims for which recovery was received. An average amount of recovery for all claims or a particular type of claim may also be calculated.

As described, systems and methods consistent with the present invention may also include various functions and capabilities. The system may require supervisory or client approval of specified actions by the system or recovery specialists. Codes may be used to designate various values and relationships, such as relationships between parties involved in a case. Information such as names and contact information may be maintained for parties related to a case. The system may be utilized through a standard web browser and computer connected to the interne. The system has the ability to search for and retrieve cases or claims based on a variety of search criteria such as subscriber identifier, dollar amount, client, etc. The system may be adapted to require certain tasks be performed before other tasks can be executed. Tasks may be created in consideration of previously executed tasks, additional information, or additional claims. Various reports may be created about one or more cases detailing the information about paid claims. Claims can be transferred from one case to another or deleted from a case altogether. Client profiles may be maintained that indicate how a client desires to make certain decisions, such as threshold amounts. Expenses payable such as the cost of police reports, investigators, attorney fees, etc. may be maintained for each case. A list of tasks that require attention and a timeline showing the time estimated to complete each task is accessible to a user.

Other embodiments of the invention will be apparent to those skilled in the art of consideration of the specification and practice of the invention disclosed herein. It is intended that the specification and examples be considered as exemplary only, with a true scope and spirit of the invention being indicated by the following claims.

What is claimed is:

1. A method for managing insurance claims with a computer, comprising:
receiving data, by a processor of the computer, for a first insurance claim by an injured party;
determining from the data, by the processor, whether the first insurance claim has recovery potential;
thereafter when it is determined that the first insurance claim has recovery potential, collecting information about an event from which the first insurance claim was derived;
creating a request for information regarding additional insurance claims related to the first insurance claim which were paid within a specified time period surrounding the date of the event from which the first insurance claim was derived;
receiving, by the processor, a history file comprising data for claims for the injured party from the specified time period;
detecting, by the processor, whether additional insurance claims arose from the event by comparing the data for the first insurance claim with the data contained in the history file;
when the additional insurance claims are detected, processing the first insurance claim and the additional insurance claims together using the processor; and
outputting, by the processor, data resulting from the processing.

2. The method for managing insurance claims with a computer of claim 1, wherein determining from the data whether the first insurance claim has recovery potential comprises:
applying weights to specified portions of the data;
adding the weighted values together;
comparing the sum of the weighted values to a threshold value.

3. The method for managing insurance claims with a computer of claim 2, wherein the specified portions are selected from a diagnosis code, a length of time between an injury and a treatment, and an age of the injured person when the injury occurred.

4. The method for managing insurance claims with a computer of claim 1, wherein collecting information about the event from which the first insurance claim was derived comprises:
determining information required to process the claim, based on predefined criteria reflected by the first insurance claim including at least one of an injury type, age of the injured person, date of injury, date of treatment, length of time from injury to treatment, recovery source, jurisdiction in which the injury occurred, client, value of the first insurance claim, and type of treatment;
generating and sending a request for the required information to an insurance subscriber;
receiving information from the insurance subscriber;
determining whether all required information has been received; and
generating additional requests for information, provided all required information has not been received.

5. The method for managing insurance claims with a computer of claim 4, further comprising determining whether to reject a claim based, at least in part on, the information received from the insurance subscriber and predefined legal provisions.

6. The method for managing insurance claims with a computer of claim 1, further comprising assigning one or more related insurance claims to a recovery specialist based on expertise of the recovery specialist and predefined criteria reflected by the first insurance claim, including at least one of an injury type, age of the injured person, date of injury, date of treatment, length of time from injury to treatment, recovery source, jurisdiction in which the injury occurred, client, value of the first insurance claim, and type of treatment.

7. The method for managing insurance claims with a computer of claim 1, further comprising recording information about all actions taken during the processing of the first insurance claim.

8. The method for managing insurance claims with a computer of claim 1, further comprising determining whether the data for the additional insurance claims duplicates data for the first insurance claim or data for other insurance claims associated with the first insurance claim.

9. The method for managing insurance claims with a computer of claim 1, further comprising:
creating a list of tasks for processing the first insurance claim in consideration of predefined criteria reflected by the first insurance claim, the predefined criteria including at least one of:
an injury type, age of the injured person, date of injury, date of treatment, length of time from injury to treatment, recovery source, jurisdiction in which the injury occurred, client, value of the first insurance claim, and type of treatment.

10. The method for managing insurance claims with a computer of claim 1, further comprising creating a projection of the amount of recovery for the first insurance claim in consideration of applicable laws and specified criteria reflected by the first insurance claim, including at least one of an injury type, age of the injured person, date of injury, date of treatment, length of time from injury to treatment, recovery source, jurisdiction in which the injury occurred, client, coverage limits, value of the first insurance claim, and type of treatment.

11. The method for managing insurance claims with a computer of claim 10, further comprising generating a probability that the projected recovery will be received by a specified date.

12. The method for managing insurance claims with a computer of claim 1, further comprising generating statistics for use in analyzing efficiency in managing subrogation and recovery of insurance claims.

* * * * *